United States Patent
Hawtof et al.

(10) Patent No.: US 6,925,840 B2
(45) Date of Patent: Aug. 9, 2005

(54) METHOD OF MAKING A PHOTONIC CRYSTAL PREFORM

(75) Inventors: Daniel W. Hawtof, Corning, NY (US); Karl W. Koch, III, Elmira, NY (US); Natesan Venkataraman, Corning, NY (US)

(73) Assignee: Corning Incorporated, Corning, NY (US)

( * ) Notice: Subject to any disclaimer, the term of this patent is extended or adjusted under 35 U.S.C. 154(b) by 237 days.

(21) Appl. No.: 10/448,931

(22) Filed: May 29, 2003

(65) Prior Publication Data

US 2004/0240817 A1 Dec. 2, 2004

(51) Int. Cl.⁷ .......................... C03B 37/023; G02B 6/16; G02B 6/18
(52) U.S. Cl. .................... 65/385; 385/123; 385/124; 385/141; 385/52; 65/406; 65/407
(58) Field of Search .............................. 385/13, 33, 52, 385/123, 124, 141, 142; 65/385, 406, 407

(56) References Cited

U.S. PATENT DOCUMENTS

| | | | |
|---|---|---|---|
| 5,028,105 A | * 7/1991 | Drexhage et al. | 385/33 |
| 5,136,677 A | * 8/1992 | Drexhage et al. | 385/123 |
| 6,208,776 B1 | * 3/2001 | Prohaska et al. | 385/13 |
| 6,418,258 B1 | 7/2002 | Wang | 385/125 |
| 6,522,820 B2 | 2/2003 | Wang | 385/125 |
| 6,636,677 B2 | 10/2003 | Hasegawa et al. | 385/127 |
| 2002/0031303 A1 | 3/2002 | Wang | 385/39 |
| 2002/0031319 A1 | 3/2002 | Wang | 385/125 |
| 2003/0108316 A1 | 6/2003 | Maroney et al. | 385/126 |
| 2003/0118315 A1 | * 6/2003 | Hewak et al. | 385/142 |

FOREIGN PATENT DOCUMENTS

WO   WO 00/16141   3/2000   ............ G02B/6/22

* cited by examiner

Primary Examiner—Frank G. Font
Assistant Examiner—Mary El-Shammaa
(74) Attorney, Agent, or Firm—Kevin M. Able (57) ABSTRACT

Disclosed is a method of making a photonic crystal optical fiber preform by stacking and bonding individual glass disks. In one embodiment, each glass disk has a pattern of voids formed therethrough, and the pattern for each disk is the same. In another embodiment, glass blanks are formed without voids and stacked with disks having voids wherein an optical fiber preform is formed having channels closed at both ends by glass having no channels. Also disclosed is an optical fiber having channels closed at both ends by glass without channels.

20 Claims, 7 Drawing Sheets

METHOD OF MAKING A PHOTONIC CRYSTAL PREFORM

BACKGROUND AND SUMMARY

1. Field of the Invention

This invention relates to the manufacture of an optical fiber preform. More specifically, the invention relates to a method of manufacturing an optical fiber preform having a pattern of voids extending longitudinally through the preform.

2. Background of the Invention

A photonic crystal is a structure having a periodic variation in dielectric constant. The periodic structure may be 1, 2 or 3 dimensional. The photonic crystal allows passage of certain light wavelengths and prevents passage of certain other light wavelengths. Thus, the photonic crystals are said to have allowed light wavelength bands and band gaps that define the wavelength bands that are excluded from the crystal.

At present, the wavelengths of interest for telecommunication applications are in the range of about 800 nm to 1625 nm. Of particular interest is the wavelength band in the range of about 1300 nm to 1600 nm.

Light having a wavelength in the band gap may not pass through the photonic crystal. However, light having a wavelength in bands above and below the band gap may propagate through the crystal. A photonic crystal exhibits a set of band gaps which are analogous to the solutions of the Bragg scattering equation. The band gaps are determined by the pattern and period of the variation in dielectric constant. Thus the periodic array of variation in dielectric constant acts as a Bragg scatterer of light of certain wavelengths in analogy with the Bragg scattering of x-rays wavelengths by atoms in a lattice.

Introducing defects into the periodic variation of the photonic crystal dielectric constant can alter allowed or non-allowed light wavelengths that can propagate in the crystal. Light which cannot propagate in the photonic crystal but can propagate in the defect region will be trapped in the defect region. Thus, a line defect within the crystal can serve as a localized "light tunnel". Specifically, a line defect in the photonic crystal can act as a waveguide for a mode having a wavelength in the band gap, the crystal lattice serving to confine the guided light to the defect line in the crystal. A particular line defect in a three dimensional photonic crystal would act as a waveguide channel for light wavelengths in the band gap. A review of the structure and function of photonic crystals is found in, "Photonic Crystals: putting a new twist on light", Nature, vol. 386, Mar. 13, 1997, pp. 143–149, Joannopoulos et al.

A first order band gap phenomenon is observed when the period of the variation in dielectric constant is of the order of the light wavelength which is to undergo Bragg scattering. Thus, for the wavelengths of interest, i.e., in the range of about 1300 nm to 1600 nm, as set forth above, a first order band gap is achieved when the period of the variation is about 500 nm. However, photonic crystal effects can occur in crystals having dielectric periodicity in the range of about 0.1 $\mu$m to 5 $\mu$m. Nevertheless, a two or three-dimensional photonic crystal having even a 5 $\mu$m spatial periodicity is difficult to fabricate.

Conventional processes have been used to create glass honeycomb structures suitable for forming photonic crystals. The prior art approaches to manufacturing this type of glass honeycomb article are either to fuse individual rods and/or hollow tubes together or to machine out a solid piece of glass to form a multi-channeled article.

These prior art processes are problematic for several reasons. Firstly, it is difficult to fuse multiple rods and/or hollow capillary tubes to form a multi-channeled article which can then optionally be hot-drawn down and re-bundled again and again into a progressively finer and finer array of hollow channels. Secondly, it is difficult to assemble and fuse multiple rods and/or hollow tubes uniformly into a perfect honeycomb structure. Thirdly, the diameter of the individual rods and/or hollow tubes that can be easily handled limits the number of tubes in the first bundle towards making the honeycomb structure, because there is a practical limit to the diameter of the assembly that can be uniformly hot-drawn down. Lastly, it is extremely expensive and time consuming to machine a multitude of deep channels into a glass object.

Ceramic honeycomb structures such as Celcor® (a cordierite honeycomb structure used commercially as a substrate for automotive catalytic converters. Celcor® is a registered trademark of Corning Incorporated) and glass-ceramic mixtures have been paste-extruded from particulate material, but the resulting honeycomb article is not transparent to light, significantly reducing its utility. In addition, the honeycomb article is crystalline in nature, making post-forming operations difficult. Further, the particle sizes of the raw material used in the Celcor® process are relatively large. The particle size can significantly affect the minimum wall thickness for an extruded honeycomb structure.

U.S. Pat. No. 6,260,388 to Borrelli discloses a method of making multi-channeled structures by extruding a silica-containing paste. In this method, a paste comprised of glass soot powders and a binding agent is extruded and sintered to form an optical fiber preform.

A disadvantage of the foregoing extrusion method is the low porosity and poor permeability of the greenware body as a consequence of high-pressure extrusion. Although light propagating in a photonic crystal structure comprising a plurality of channels or passageways propagates principally in a central channel or channels, a small percentage of the light also propagates in the walls of the channels. Contaminants contained in the channel walls therefore contribute to loss, or attenuation, of the propagating light.

Thus, the deficiencies inherent in prior art processes leave open the need for a method of manufacturing a photonic crystal optical fiber preform that is straight-forward to implement, and flexible enough to provide an optical fiber preforms with a variety of channel patterns.

SUMMARY OF THE INVENTION

In one embodiment according to the present invention, a method for making an optical fiber preform is disclosed comprising providing a plurality of glass disks, each disk having a first side, a second side, a thickness therebetween, and a refractive index which is constant throughout the disk, and forming a plurality of voids in a pre-determined pattern in each disk therethrough. Each disk has the same pre-determined pattern of voids. The individual disks are then stacked such that the holes in one disk are aligned with the holes in another disk to form an elongate assembly. The assembly is bonded to form an optical fiber preform.

Preferably, the disks are aligned before bonding by stacking the disks on alignment rods. Preferably, the alignment rods are comprised of graphite. More preferably the alignment rods are comprised of a polymer.

More preferably, the disks are aligned by forming alignment recesses in the glass disks, inserting glass registration pins in the alignment recesses of one mating surface of a first disk, and stacking the mating face of a second disk onto the mating disk of the first disk such that the registration pins in the mating face of the first disk are inserted into the alignment recesses of the second disk.

Once the assembly is formed, the disks comprising the assembly are bonded by subjecting the assembly to heat and pressure sufficient to bond the mating surfaces of the glass disks. Preferably, bonding is performed without the use of adhesives. Preferably, bonding is performed at a temperature less than about 2100° C., more preferably less than about 300° C., most preferably between about 100° C. and 200° C. Preferably, bonding is performed in an inert atmosphere. Preferably, the atmosphere is comprised of helium. More preferably, bonding is performed in a vacuum.

After the assembly has been bonded to form an optical fiber preform, and if alignment rods were used to stack the disks with proper registration of the voids, the assembly is heat treated in the presence of oxygen to burn out the alignment rods. The assembly is heat treated at a temperature preferably greater than about 800° C. in the presence of oxygen, more preferably greater than about 1000° C. If glass registration pins were used in stacking the disks, burnout is not required.

In another embodiment of the present invention, a plurality of glass disks without voids are formed (glass blanks) and stacked with disks having voids to form an assembly of disks and glass blanks that is bonded to form an optical fiber preform having a plurality of channels interrupted by glass having no channels. Preferably, the glass blanks and the glass disks alternate along a length of the assembly. Preferably, the glass disks and the glass blanks are assembled and/or bonded in an environment comprising an inert gas such that when the disks and blanks are bonded to form an optical fiber preform, and the optical fiber preform is drawn into an optical fiber, the optical fiber is comprised of channels extending longitudinally along the length of the optical fiber, wherein the channels are interrupted by glass having no channels, and the channels contain an inert gas.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale. The drawings illustrate one or more embodiment(s) of the invention, and together with the description serve to explain the principles and operation of the invention.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components will bear the same designations and numbering throughout the figures.

DETAILED DESCRIPTION OF THE INVENTION

Figure 1:
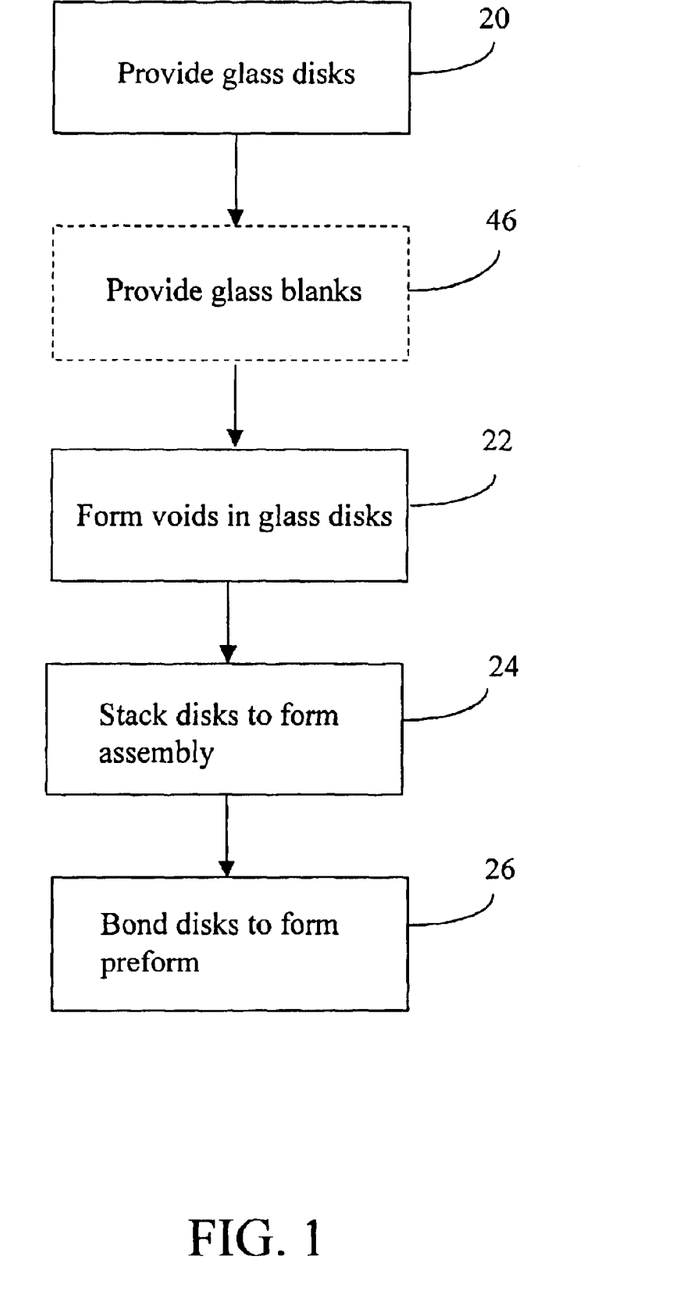
FIG. 1 is an illustration of the method according to the present invention.

FIG. 1 shows one embodiment of the method according to the present invention. In step 20 of the embodiment, a plurality of glass disks are provided. A suitable means for forming the disks is to slice individual disks from a cylindrical glass boule. A suitable glass boule from which disks may be prepared can be formed by core drilling a larger glass sheet as may be found in the optical glass industry. Depending upon the thickness of the sheet, single disks may be core drilled, or, in the case where the sheet is very thick, on the order of at least several disk thicknesses, longer cylindrical bodies may be core drilled from the sheet, wherein individual disks may be sliced from the body. Preferably the glass boule is formed by conventional chemical vapor deposition (CVD) methods such as those used in the manufacture of optical fiber. Such CVD methods include outside vapor deposition (OVD), modified chemical vapor deposition (MCVD) or vapor axial deposition (VAD). In a conventional OVD method, for example, one or more glass forming chemical precursors, such as $SiCl_4$, are introduced into a burner flame and hydrolyzed and/or oxidized. The resulting glass soot may be deposited longitudinally on the periphery of a rotating starting rod to form a porous glass boule. The porous glass boule is then heated in an atmosphere containing a cleansing gas, such as, for example, chlorine, that removes, inter alia, hydrogen-containing species such as OH radicals and transition metals. The cleansed boule is further heated to a temperature sufficient to sinter the glass soot, thereby forming a consolidated glass preform that is clear and nonporous, being either substantially or completely free of interstitial voids that characterize the space between individual glass particles comprising soot in a porous glass boule. Once the boule has been sintered, appropriately sized disks may be sliced from the boule by mechanical means. For example, a diamond saw may be used to slice disks from the boule. Preferably, disks are less than about 5 cm in thickness, more preferably less than about 4 cm, and most preferably between about 2.5 cm and 4 cm. Preferably, the disks are between 5 cm and 13 cm in diameter, more preferably between about 8 cm and 10 cm. Individual disks are polished by mechanical and/or chemical means to form mating faces that are flat and smooth. For example, a disk may be slurry polished with an abrasive, then acid-cleaned with a wash of hydrofluoric acid (HF). Preferably, the surfaces are finished to a flatness less than about 1 μm with surface roughness levels of less than about 2.0 nm RMS. It is desirable that the faces of the disk be parallel. Preferably, the faces (sides) of each disk should be parallel to within 100 μm, more preferably within about 50 μm and most preferably within about 10 μm. The faces of the disk may be check for parallelism by conventional interferometric means, for example.

Figure 2:
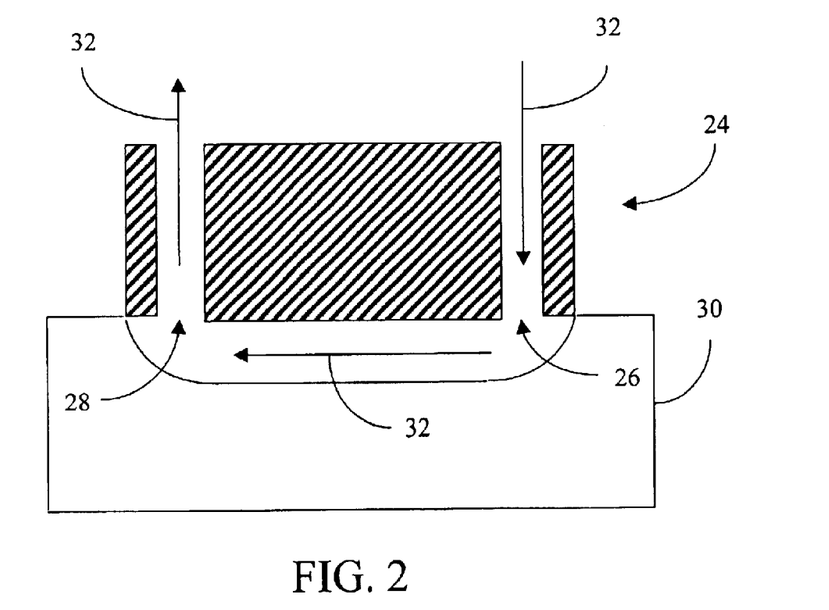
FIG. 2 is an illustration of a method of forming voids by chemical etching.

In step 22, a pattern of voids is produced in each disk. Preferably, the voids are formed by ultrasonically finishing (boring) of the disk. Ultrasonic boring of voids can be accomplished using an abrasive slurry or preferably by employing a diamond head. For example, a DMS Ultrasonic finishing machine manufactured by Deckel Maho Gildemeister may be used. In this technique, the ultrasonic vibration of a spindle is transferred to a diamond tool. The tool vibrates at a rate of 20,000 times per second, and removes very small particles from the surface of the work piece. More preferably, voids may be formed by chemical etching. A preferred method of chemically etching voids is described in Nasa Jet Propulsion Laboratory technical report NO-20732, "Chemical Machining of Microscopic Holes and Grooves in Glass", which is incorporated herein by reference. Referring to FIG. 2, in this technique, a nozzle 24 shaped appropriately for the desired void shape, and having an outlet port 26 and an inlet port 28 is pressed against the glass disk 30 in which a void shape is to be formed. As an example, a circular nozzle would be appropriate for forming circular voids. An etchant, represented by arrow 32, is flowed to disk 30, through outlet port 26 located on the face of nozzle 24 opposite glass disk 30, whereupon etchant 32 flows across the region of the disk beneath nozzle 24, and is withdrawn, along with dissolved glass, through input port 28 also located on the face of nozzle 24 opposite glass disk 30. The technique is easily automated, and a precision as high as 1 micron can be attained for the thus-formed void diameter.

Figure 3:
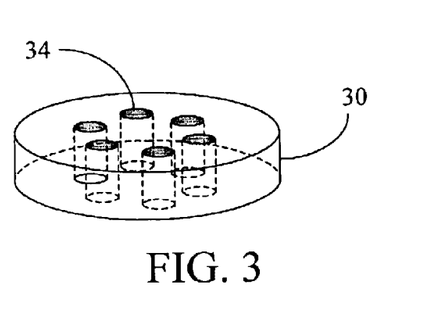
FIG. 3 is a perspective view of a glass disk according to the present invention showing a pattern of voids.
Figure 4:
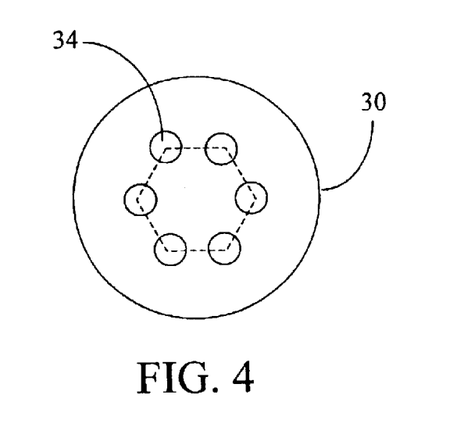
FIG. 4 is a view of a side (face) of a glass disk according to the present invention showing a pattern of voids.

FIG. 3 is a perspective illustration of a finished disk 30 according to the present invention. FIG. 4 shows an axial view of disk 30 looking at a side thereof. For simplicity of illustration, disk 30 is shown having only a few voids 34, arranged in a hexagonal pattern as indicated by the dotted outline. Each void 34 is shown as being nominally circular. However, more complicated patterns having a large number of voids are contemplated by the present invention. Moreover, individual void shapes are not limited to having a circular cross-section, but may be any other geometric shape, including shapes that provide an increased density of voids. For example, polyagonal shapes such as rectangular or hexagonal-shaped voids can be arranged in denser patterns than circular voids. Preferably, the voids are between about 0.5 cm and 1.5 cm in diameter, more preferably between about 0.75 and 1.25 cm. Not all voids within a void pattern need be of the same diameter.

Figure 5:
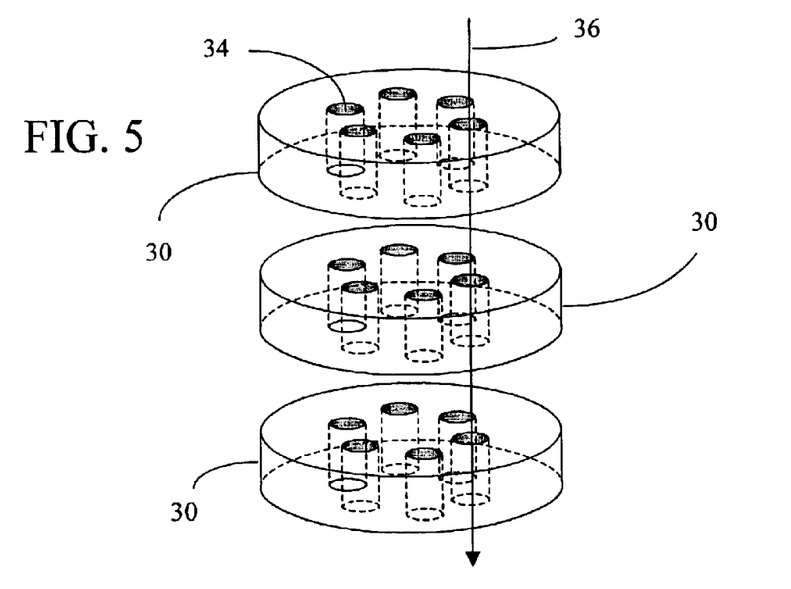
FIG. 5 is an illustration of stacking glass disks wherein the void pattern of each disk is aligned.
Figure 6:
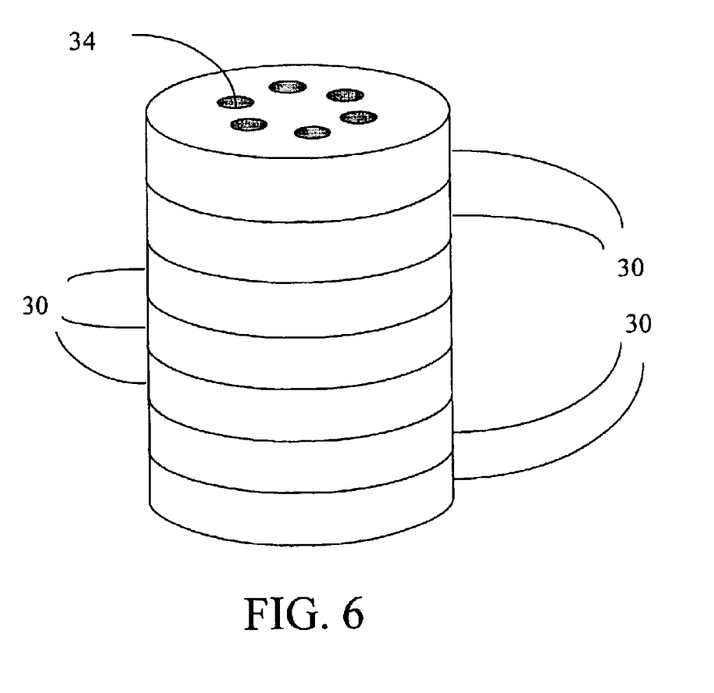
FIG. 6 is an illustration of an assembly of stacked disks.
Figure 7:
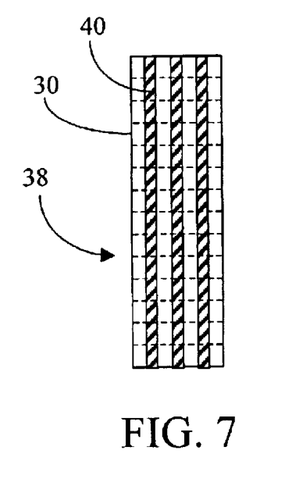
FIG. 7 is a side view of an assembly of staked disks showing the formation of channels within the assembly.

When a pre-determined number of disks 30 have been provided and the desired void pattern has been formed in each disk, a plurality of disks 30 are stacked, as indicated by arrow 36 in FIG. 5 to form an assembly 38 of disks shown in FIG. 6. The process of stacking is shown as step 24 in FIG. 1. As an example, in preparing an optical fiber preform having a length of approximately 0.3 meters, 10 disks having a thickness of about 3.048 cm would be required. Assembly 38 contains only disks having substantially identical void patterns. The plurality of disks 30 is stacked such that the pattern of voids 34 in one disk coincides with the pattern of voids in all other disks of assembly 38. The voids 34 (or similarly the disks 30) are then said to be "in registration". Coinciding voids 34 in assembly 38 form channels 40 extending longitudinally along the length of assembly 38. FIG. 7 depicts a side view of assembly 38, showing a reduced number of channels 40 for illustration purposes. Interfaces between disks 30 are shown as dashed lines in FIG. 7.

Figure 8:
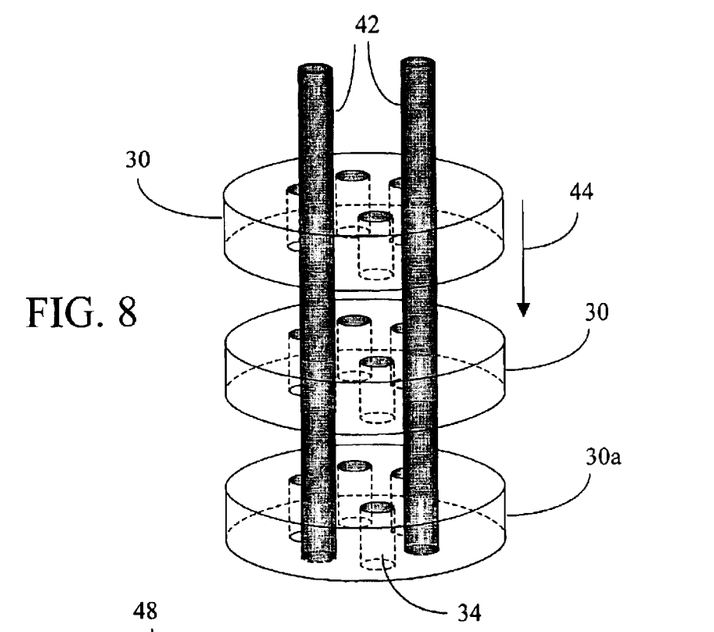
FIG. 8 is an illustration of stacking glass disks to form an assembly using alignment rods.

To achieve the appropriate level of registration, preferably a plurality of alignment rods 42 may be used, the alignment rods being sized to fit within a channel 40 formed by stacking a plurality of disks 30 with coinciding voids 34. Preferably, the plurality of alignment rods 42, as shown in FIG. 8, are inserted into a selection of predetermined voids 34 in a first disk 30a. Means should be used to secure the alignment rods in the first disk. For example, the rods may be slightly oversized at a first end and press-fitted into the first disk. The number of voids 34 into which alignment rods 42 are inserted may vary. Preferably, alignment rods 42 are inserted into at least two voids 34 in the first disk 30a, more preferably all voids. Additional disks 30 are then stacked by placing successive disks, one after another, over the alignment rods 42 such that the alignment rods 42 pass through the voids 34 in the subsequent disks coinciding with the voids in the first disk 30a as indicated by arrow 44 in FIG. 8. In addition to providing proper registration of voids 34 from one disk 30 to the next in assembly 38, the alignment rods 42 also serve to minimize deformation of the voids 34 during the subsequent bonding process, particularly when high temperatures are applied. The choice of material for the alignment rods 36 depends upon the bonding method employed to bond the disks 30 one to the other, and particularly upon the temperature that is applied. For example, for high temperature bonding of disks 30, i.e. bonding that is performed above a temperature of about 300° C., the rods 42 are preferably comprised of graphite. Bonding with graphite alignment rods is preferably performed at between about 300° C. and 2100° C. Preferably bonding is performed in an inert atmosphere. Preferably the inert atmosphere comprises helium.

For bonding techniques which are performed at temperatures below about 300° C., more preferably less than about 200° C., and most preferably between about 100° C. and 200° C., a polymer may be used for the rods 42. Examples of suitable polymers include polyethylene, polystyrene, and polytetrafluoroethylene. Although polymer materials break down (e.g. melt) at high temperatures, i.e. greater than about 300° C., and therefore cease to serve as an effective alignment mechanism, at temperatures below about 300° C. polymer materials, such as those listed supra, may be advantageously used. For example, polytetrafluoroethylene melts at about 335° C., whereas polystyrene melts at about 270° C. and polyethylene melts at about 137° C. In contrast to graphite, polymer materials are easily shaped to fit specific void shapes, and are typically much stronger than graphite. Either the graphite or polymer alignment rods 42 may be removed from the finally bonded disks (preform) by heat treating the bonded disks and the alignment rods to a temperature preferably greater than about 800° C. in the presence of oxygen, more preferably greater than about 1000° C., whereupon the alignment rods 42 are burned away leaving clean voids. The bonded disks are heat treated for a period greater than about 2 hours, more preferably greater than about 4 hours to ensure adequate burnout of the alignment rods.

Figure 9:
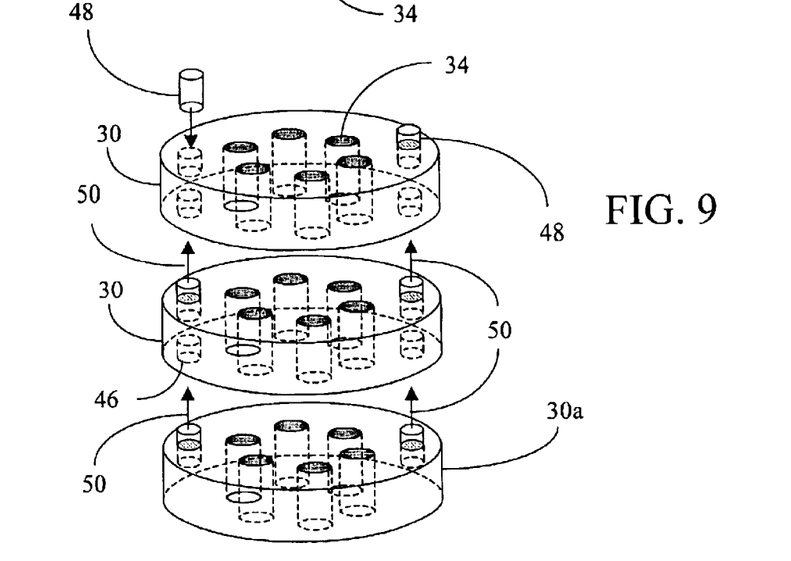
FIG. 9 is an illuistration of stacking glass disks to form an assembly using registration pins.
Figure 10:
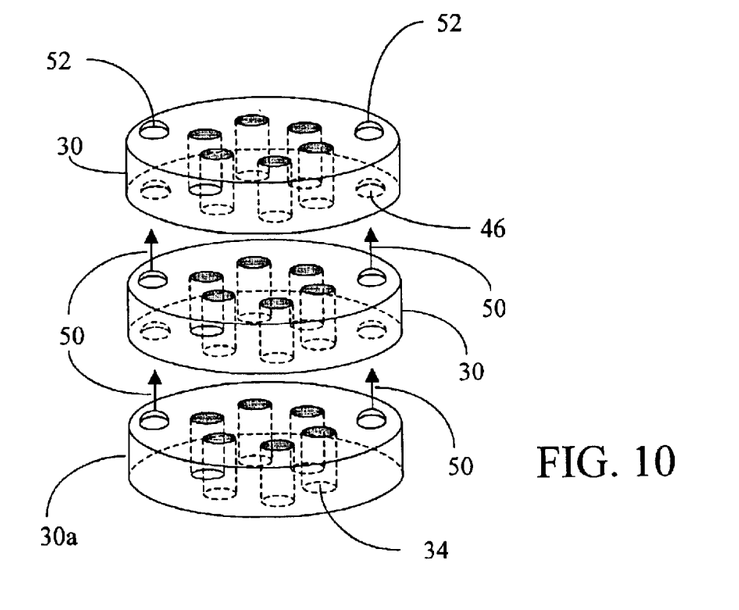
FIG. 10 is an illustration of stacking glass disks to form an assembly using alignment protrusions.

In an alternative method of registration and stacking, shown in FIG. 9, a plurality of alignment recesses 46 are machined into both faces of each disk 30 at appropriate locations, preferably along the outer periphery of the disks. The recesses 46 are arranged so that when a second disk 30 is stacked on top of a first disk 30*a*, the voids 34 in the mating face of the second disk are aligned with the voids on the mating face of the first disk 30*a*. No less than two recesses are required in each disk face that mates with another disk face to provide proper registration. Each recess 46 has a depth less than the thickness of a disk. Preferably, all disks have substantially the same thickness. Preferably, all recesses 46 are of the same length. Glass registration pins 48 are provided to ensure that each disk 30 is given the same orientation to a previously stacked disk when stacked. This requires that each recess 46 on each disk is in the same position relative to voids 34 as the corresponding recess in each successive disk 30 in assembly 38. Preferably, registration pins 48 are formed by cutting a glass rod sized to fit within a recess 46. Preferably, each registration pin 48 is no longer than twice the length of an alignment recess 46. To stack assembly 38, registration pins 48 are placed within the alignment recesses 46 on one side (mating face) of the first disk 30*a*. A second disk 30 is then placed onto the first disk such that the registration pins 48 in the mating face of the first disk are inserted into the alignment recesses 46 on the mating face of the second disk. In a similar manner, registration pins 48 are placed into the alignment recesses 46 in the exposed face of the second disk, which now becomes the new mating face of the second disk, and a third disk 30 is placed on the second disk such that the registration pins 48 are inserted into the alignment recesses 46 in the mating face of the third disk, and so forth as indicated by arrows 50 in FIG. 9. An arbitrarily long assembly 38 of disks can be produced in this manner. The degree of alignment (registration) between the voids 34 in each disk when compared to an adjacent disk will be a function of the precision of the fit between the registration pins 48 and the alignment recesses 46, and the precision of the placement of the alignment recesses 46 with respect to the voids 34 in each successive disk 30 in assembly 38. In addition to the foregoing factors, the registration of the first disk with respect to the last disk is also a function of the length of the desired optical fiber preform. For a given imprecision in fit between registration pins 48 and alignment recesses 46, for example, a long optical fiber preform will result in an increased out-of-registration condition between the pattern of voids in the first disk and the pattern of voids in the last disk than in a shorter preform. Alternatively, as illustrated in FIG. 10, alignment recesses 46 may be formed on a mating face of a first disk 30*a*, and alignment protrusions 52 shaped into a mating face of a second disk wherein the alignment recesses 46 of the first disk match the shape of the corresponding alignment protrusions 52 of the second disk. For example, an alignment recess 46 of the first disk may be of a hemispherical concave shape, while an alignment protrusion 52 on the second face is of a hemispherical convex shape. When the disks are stacked one on top of the other, a hemispherical convex shaped alignment protrusion 52 fits within a hemispherical concave shaped alignment recess 46. A plurality of matching concave and convex alignment shaped sets of alignment recesses 46 and alignment protrusions 52 provide proper registration. As in the case of registration pins, proper alignment of successive disks 30 in assembly 38 requires that placement of alignment recesses 46 and protrusions 52 relative to voids 34 is the same from disk to disk. It is not required that the same shape be used for each matching set of recesses 46 and protrusions 52. Shaping of protrusions 52 may be accomplished by any suitable means known in the glass arts, for example by machining or by chemical etching. This method differs from the aforementioned registration pins 48 in that the protrusions 52 are formed into the surface of the glass disk 30 rather than being placed into a recess in the disk as with the registration pins 48. One means of shaping the mating surfaces of the glass disks to form alignment recesses 46 and alignment protrusions 52 is through the use of magnetorheological finishing. In magnetorheological finishing an abrasive fluid that can be magnetically stiffened is directed at an article to be finished to selectively remove material from the surface of the article.

Figure 11:
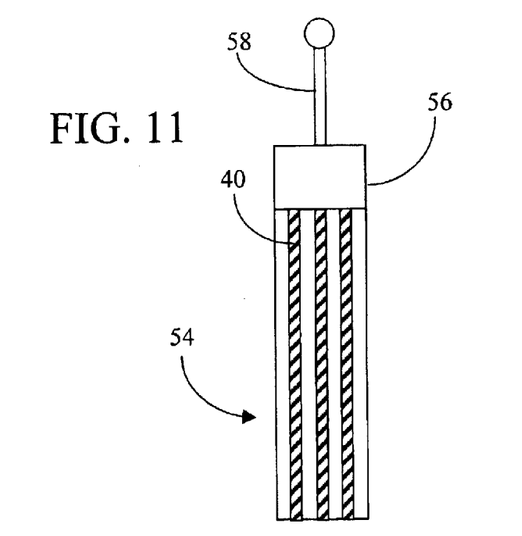
FIG. 11 is an illustration of an optical fiber preform according to the present invention having a attached headstock and handle.

Step 26 of FIG. 1 indicates a bonding step wherein the assembly 38 of stacked disks are bonded one to another to form an optical fiber preform 54 illustrated in FIG. 11. FIG. 11 shows a solid glass optical fiber preform 54 having longitudinal channels 40 extending longitudinally therethrough. Bonding of the disks in assembly 38 may be performed by subjecting assembly 38 to heat and pressure. This may be performed in a chamber that can be heated and pressurized with an inert gas such as, for example, helium. In a preferred embodiment, a bonding method is used that provides an impermeable, optically clear seal without the use of adhesives, meaning that there is essentially zero distortion of light passing between the interface of the bonded surfaces. Acceptable methods include, but are not limited to, wringing, vacuum bonding and chemical bonding. The formation of a direct bond between two glass surfaces allows for an impermeable seal that has the same inherent physical properties as the bulk material surfaces being bonded. Wringing refers to a process of bonding glass surfaces in which adsorbed surface groups are removed from active bonds on a surface by heating the parts to temperatures typically above 600° C. but below the softening point of the glass. Adsorbed water and organic materials will vaporize and the resulting surface sites become "active." At such a temperature, or after cooling in a clean, low humidity environment, surfaces can be placed in contact at which point covalent bonds spontaneously form between "active" bonds on each surface. This is similar to vacuum bonding, except the surface is activated by temperature rather than by a strong vacuum. Vacuum bonding involves bringing two clean surfaces into contact in a high vacuum, thus forming a bond. Provided that the surfaces are flat and clean, a high vacuum removes adsorbed water and hydrocarbons from the surface while preventing the adsorption of such species. According to one embodiment of the invention, functional groups are provided on opposing surfaces of the articles to be bonded. No adhesives, high temperature pre-treatment or caustic hydrofluoric acid treatments are required prior to bonding the opposing surfaces. In one such embodiment of the invention, a surface treatment of a high pH base solution such as sodium hydroxide, potassium hydroxide or ammonium hydroxide is utilized to provide functional groups on the bonding surfaces of the articles. In a preferred embodiment, the surfaces are first cleaned using a detergent followed by rinsing with an acid solution, such as a nitric acid solution, to remove particulate contamination and soluble heavy metals, respectively. According to another embodiment of the invention, the surfaces are contacted with a high pH solution, rinsed, pressed into contact and gradually heated to the desired temperature, preferably to a temperature less than 300° C. It is preferable to use a "clean" heat source. That is, a heat source that does not introduce contaminants or byproducts to interfere with bonding. Such heat sources include, but are not limited to, induction heating, microwave heating, radio frequency (RF) heating and electric resistance heating. To enhance bonding, it is preferred that the surfaces are flat, as determined by performing a preliminary cleaning, and then pressing the dried samples into contact. Resulting interference fringes can be acquired according to techniques known in the art and interpreted to determine matching flatness. Also, an optical flat or interferometer can be used to evaluate individual surface flatness. Preferably, the bonding process of the present invention consists of machining each surface to be sealed to an appropriate flatness. Particularly preferred flatness levels are less than between about 50 $\mu$m and 60 $\mu$m, with roughness levels of less than about 0.2 nm RMS. After polishing, each surface is preferably cleaned with an appropriate cleaning solution such as a detergent, soaked in a low pH acidic solution, and soaked in a high pH basic solution to generate a clean surface with silicic acid-like (i.e., $\equiv$Si—OH, $=$Si—(OH)$_2$, —Si—(OH)$_3$ and —O—Si—(OH)$_3$) terminated surface groups. In a preferred embodiment, the surfaces are assembled without drying. A low to moderate load (as low as 1 PSI) is then applied as the surfaces are heated to preferably less than 300° C., more preferably less than about 200° C., most preferably between about 100° C. and 200° C., so that absorbed water evaporates and silicic acid-like surface groups condense to form a covalently-bonded interface. For glass surfaces having a high percentage of silica, for example greater than about 90% silica, higher temperature heating is not necessarily required to form high strength bonds. For high silica articles, heating below 300° C. is usually sufficient to form a high strength bond. On the other hand, articles that have a lesser amount of silica in the glass composition may require heating to higher temperatures to form a satisfactory bond. For example, Pyrex® glass (containing approximately 81% silica) and Polarcor™ (containing approximately 56% silica), which are borosilicate glasses, may require additional heating to provide sufficient bond strength for applications requiring high bond strength.

Another type of bonding process that may be utilized according to the present invention involves chemical bonding. The formation of a chemical bond between two glass surfaces allows for an impermeable seal that has the same inherent physical properties as the bulk material being bonded. In literature, low-temperature bonding technology has been reported for bonding soda-lime-silicate glass and for crystalline quartz (see, e.g., A. Sayah, D. Solignac, T. Cueni, "Development of novel low temperature bonding technologies for microchip chemical analysis applications," Sensors and Actuators, 84 (2000) pp. 103–108 and P. Rangsten, O. Vallin, K. Hermansson, Y. Backlund, "Quartz-to-Quartz Direct bonding," J. Electrochemical Society, V. 146, N. 3, pp. 1104–1105, 1999). Both the Sayah and Rangsten references, disclose using acid cleaning techniques. Another article, H. Nakanishi, T. Nishimoto, M. Kani, T. Saitoh, R. Nakamura, T. Yoshida, S. Shoji, "Condition Optimization, Reliability Evaluation of SiO2—SiO2 HF Bonding and Its Application for UV Detection Micro Flow Cell," Sensors and Actuators, V. 83, pp. 136–141, 2000, discloses low-temperature bonding of fused SiO$_2$ by first contacting the bonding surfaces with hydrofluoric acid.

As discussed previously, an optical fiber preform 54 that has been formed by employing alignment rods is heat treated to burn out the alignment rods. This may be accomplished by heating preform 54, containing alignment rods, to a temperature preferably greater than about 800° C. in the presence of oxygen, more preferably greater than about 1000° C. The preform is preferably heat treated for a period of greater than about 2 hrs., more preferably greater than about 4 hours.

Once the assembly has been bonded to form preform 54, and after any alignment rods have been burned out, a glass headstock 56 which comprises a handle 58 may be attached to preform 54. The handle provides a means of securing preform 54 in the draw furnace when the preform is drawn into an optical fiber. For example, a glass handle 58 may have a ball-shaped protuberance at a distal end from the preform that fits within a yoke. The yoke in turn is attached to an appropriate mechanism for raising or lowering preform 54 in the draw furnace. After attachment of the handle and headstock, the optical fiber perform according to the present invention may be placed in the hot zone of a conventional draw furnace and drawn into a photonic crystal optical fiber. The photonic crystal optical fiber thus drawn is comprised of a plurality of channels extending longitudinally along the length of the optical fiber. The optical fiber may then be employed in an optical fiber telecommunication system. For example, such fibers have been found to be advantageously employed as dispersion compensation fibers. Photonic crystal fibers according to the present invention may also be employed to provide energy transfer, for example, the transfer of UV energy.

Figures 12, 13:
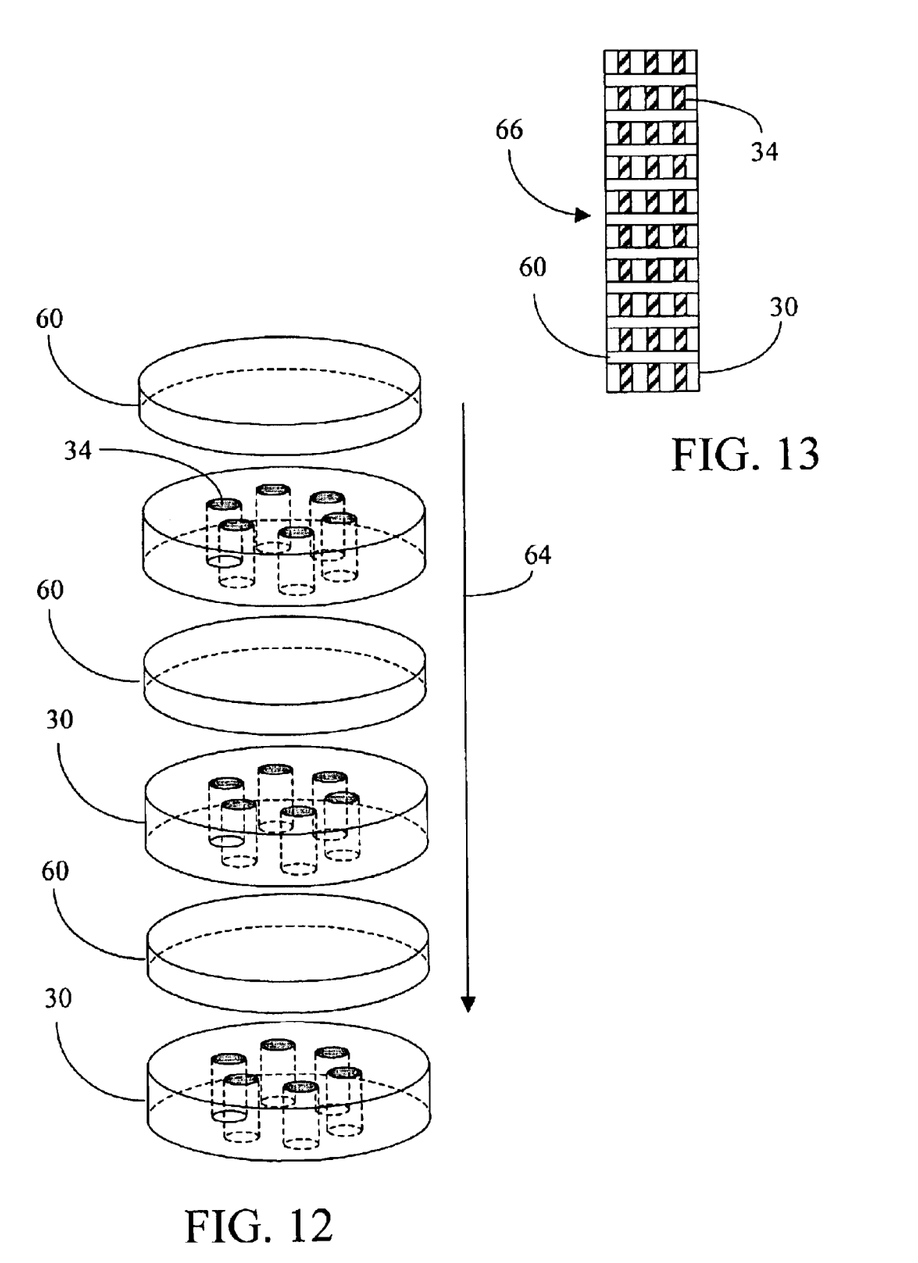
FIG. 12 is an illustration of stacking glass disks and glass blanks to form an assembly.
FIG. 13 is an illustration of an assembly of glass disks and glass blanks.
Figure 14:
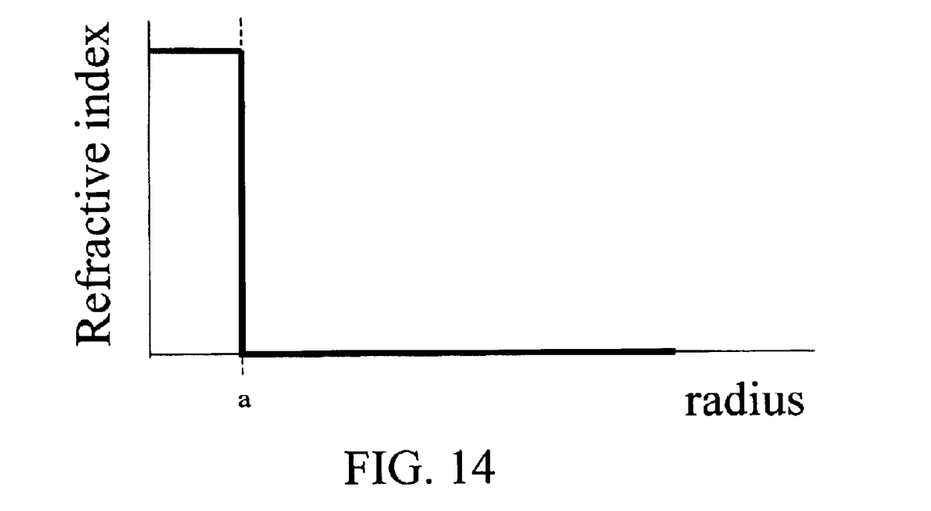
FIG. 14 depicts a refractive index profile having a step refractive index shape.
Figure 15:
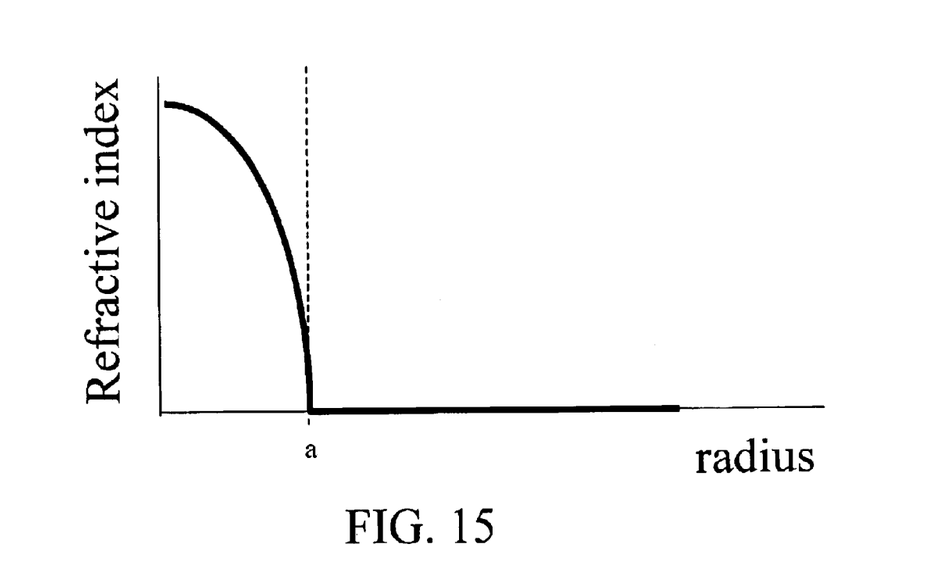
FIG. 15 depicts a refractive index profile having an α core refractive index shape.

In another embodiment of the invention, a plurality of disks 30 are formed in a manner as previously disclosed. As before, the void pattern in each disk is substantially the same. A second plurality of disks is similarly formed, but without voids, hereinafter referred to as glass blanks 60, as illustrated in FIG. 12 and as indicated by the optional step 46 in FIG. 1. Preferably, glass blanks 60 have a thickness less than the thickness of the disks 30 having voids. Preferably, the thickness of the glass blanks is between 1–3 mm. Preferably, each glass blank has the same thickness as each other glass blank. Preferably, the glass blanks have the same diameter as the glass disks. The disks 30 and glass blanks 60 are then stacked, as represented by arrow 64, such that the resulting assembly 66, as shown in FIG. 13, has glass blanks 60 arranged with glass disks 30 along the length of assembly 66. Preferably the glass blanks 60 are separated by one or more disks 30 having voids 34. More preferably, disks 30 with voids and glass blanks 60 are alternated within assembly 66. Preferably, the glass blanks 60 are cut from a homogenous piece of glass, meaning the glass has a substantially constant refractive index throughout. More preferably the glass blanks 60 are cut from a conventional optical fiber source preform comprising a core glass and a cladding glass disposed about and in contact with the core glass. The core glass has a refractive index higher than the refractive index of the cladding glass, thereby forming a light-guiding structure. This light-guiding structure assists in the coupling of light between coinciding voids/channels on either side of the glass blank. Preferably, the refractive index of the core glass region is constant (a "step" index profile) from the centerline of the core glass region to a periphery thereof. An example of a step index profile is illustrated in FIG. 14. FIG. 14 shows a refractive index of the source preform as a function of radius from the centerline of the source preform. More preferably, the refractive index of the core glass region has an alpha ("$\alpha$") profile. The term alpha profile refers to a refractive index profile which follows the equation, $$n(r) = n_0(1\Delta[r/a]^\alpha) \tag{1}$$

where r is core radius, a is the last point of the core in the profile, r is chosen to be zero at the first point of the profile, $n_0$ is the maximum refractive index of the core, and $\alpha$ is an exponent which defines the core profile shape. A preferred $\alpha$ profile has an $\alpha$ value of about 2, although it is to be understood that other $\alpha$ values are possible, depending upon need. An example of an $\alpha$ profile is shown in FIG. 15. In both FIG. 14 and FIG. 15, "a" represents the last point of the core in the respective profile. Other core refractive index profile shapes include a trapezoidal index and a rounded step index, in which the rounding is due to dopant diffusion in regions of rapid refractive index change. To ensure proper registration of the disks 30 having voids 34 during stacking, alignment recesses 46 are preferably formed in the mating surfaces of both the disks 30 and the glass blanks 60, and registration pins 48 or alignment protrusions 52 are utilized as previously disclosed. Likewise, an optical fiber preform is formed by bonding the glass disks 30 and the glass blanks 60 of assembly 66 in any one of the manners as previously disclosed, or by other suitable means which may be used to bond glass articles. The embodiment results in an optical fiber preform having a plurality of elongated voids, or channels, between intervening regions of glass without voids or channels. This compartmentalization inhibits significant lengthwise migration of contaminants along exposed (open) channels when the optical fiber, resulting from drawing the thus formed optical fiber preform, is cut. One such contaminant is the hydroxyl radical ("water"), which may cause an undesirable increase in the optical loss of the fiber. It is therefore desired that the environment within a channel 40 formed by one or more consecutive voids 34 is free from water. The channel environment may be formed, for example, by assembling and/or bonding the glass disks 30 and the glass blanks 60 in an appropriate atmosphere. Preferably the atmosphere in which the glass disks 30 and the glass blanks 60 are assembled and/or bonded is comprised of helium.

As previously discussed, a handle and headstock are attached to the optical fiber perform, after which the preform may be placed in the hot zone of a conventional draw furnace and drawn into a photonic crystal optical fiber. When the optical fiber preform 62 is drawn into an optical fiber, the individual voids in each disk are elongated and transferred into the optical fiber. These elongated voids, or channels 64, are interrupted at pre-determined locations along their length by glass which has no voids, the glass without voids corresponding to the placement of the glass blanks 60 within the assembly 66. If the glass blanks are arranged in the assembly having a predetermined periodicity, the drawn optical fiber will have channels also interrupted at a pre-determined periodicity. The optical fiber thus drawn may then be employed in an optical fiber telecommunication system.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

We claim:
1. A method for making an optical fiber preform comprising:
   providing a plurality of glass disks, each disk having a first side, a second side, a thickness therebetween, and a refractive index which is constant throughout the disk;
   forming a plurality of voids in a pre-determined pattern in each disk therethrough, each disk having the same pre-determined pattern of voids;
   stacking the disks such that the voids in one disk are aligned by alignment elements with the voids in another disk to form an elongate assembly;
   bonding the assembly to form an optical fiber preform.
2. The method of claim 1 wherein the alignment elements comprises a plurality of alignment rods, the alignment rods passing through the voids.
3. The method of claim 2 wherein the rods are comprised of graphite.
4. The method of claim 2 wherein the rods are comprised of a polymer.
5. The method of claim 4 wherein the polymer is chosen from the group consisting of polyethylene, polystyrene and polytetrafluoroethylene.
6. The method of claim 1 wherein the alignment elements comprises registration pins.
7. The method of claim 1 wherein the alignment elements comprises alignment protrusions.
8. The method of claim 1 wherein the bonding step further comprises bonding the assembly without an adhesive.
9. The method of claim 8 wherein bonding is performed at a temperature greater than about 300° C.
10. The method of claim 8 wherein the bonding is performed at a temperature less than about 300° C.
11. The method of claim 10 wherein the bonding is performed at a temperature between about 100° C. and 200° C.
12. The method of claim 1 wherein the stacking step further comprises stacking a plurality of glass blanks between the disks with voids.
13. The method of claim 12 wherein the glass blanks and the disks with voids alternate along a length of the elongate assembly.
14. The method of claim 12 wherein the plurality of glass blanks have a refractive index which is constant across a diameter of the glass blanks.
15. The method of claim 12 wherein the plurality of glass blanks have a refractive index which varies across a diameter of the glass blanks.
16. The method of claim 13 wherein a thickness of the glass blanks is less than the thickness of an adjacent disk.
17. The method of claim 1 further comprising drawing the optical fiber preform into an optical fiber.
18. A telecommunication system comprising the optical fiber of claim 17.
19. An energy transfer system comprising the optical fiber of claim 17.
20. An optical fiber made by the method of claim 1 comprising:
   A pattern of elongate voids along a length of the optical fiber wherein the elongate voids are interrupted by glass having no voids at a plurality of pre-determined locations along the length of the optical fiber.

* * * * *

UNITED STATES PATENT AND TRADEMARK OFFICE
CERTIFICATE OF CORRECTION

PATENT NO. : 6,925,840 B2  Page 1 of 1
APPLICATION NO. : 10/448931
DATED : August 9, 2005
INVENTOR(S) : Natesan Venkataraman et al.

It is certified that error appears in the above-identified patent and that said Letters Patent is hereby corrected as shown below:

| Col. | Line | Description |
|---|---|---|
| 12 | 16 | In claim 2 the word "comprises" should be "comprise". |
| 12 | 25 | In claim 6 the word "comprises" should be "comprise". |
| 12 | 27 | In claim 6, the word "comprises" should be "comprise". |

Signed and Sealed this

Eleventh Day of July, 2006

JON W. DUDAS
*Director of the United States Patent and Trademark Office*